AUTOMATIC WEB BUFFERING MEANS

Filed Dec. 26, 1967

INVENTOR
PAUL J. BADUM

BY Bernard W. Goldman
ATTORNEY

United States Patent Office
3,499,614
Patented Mar. 10, 1970

3,499,614

AUTOMATIC WEB BUFFERING MEANS

Paul J. Badum, Boulder, Colo., assignor to International Business Machines Corporation, Armonk, N.Y., a corporation of New York Filed Dec. 26, 1967, Ser. No. 693,194
Int. Cl. G11b *15/58*
U.S. Cl. 242—182 6 Claims

ABSTRACT OF THE DISCLOSURE

A tape drive with each reel connecting to a constant torque motor and providing tape to a variable-force vacuum column. Unidirectional motor torque is continuously applied to each reel for withdrawing tape from its vacuum column during bidirectional tape operation. A tape capstan and brake are located in the tape path between the two vacuum columns. The capstan and brake are driven and controlled independently of the reel motors to obtain total tape buffering. The static position of the tape loop in each column is a function of the tape radius of the adjacent reel at the particular time.

This invention relates generally to tape drives with vacuum columns, which permit tape to be driven independently of tape reel motion in order to obtain fast start/stop operation.

A novel factor in this invention is a tape drive arrangement that avoids the requirement for any loop position sensor with any vacuum column, and avoids any servo system for controlling respective reel motion in response to a sensed loop position in a vacuum column, while obtaining the benefits of tape drives having loop position sensors with reel servos.

The phase "variable-force vacuum column" is defined as a vacuum column in which the force on the tape loop varies with the position of the loop in the column. Examples are tapered vacuum columns, parallel wall vacuum columns with slots or openings at various positions through the wall of the column connected to atmosphere or a vacuum source, and a combination of these examples.

The prior art shows tape drives having tapered vacuum columns, such as U.S. Patent No. 3,112,473 to Wicklund et al., in which the respective reel drive motors are operated in response to loop position sensors associated with the respective vacuum column. In such case, when the tape loop moves above or below a particular position in a column, it actuates a sensor, such as a vacuum switch, or photocell, which actuates a servo for a respective reel motor to rotate the adjacent reel in a direction which moves the loop toward a more or less central position in the column. When the loop is positioned in the central portion of the vacuum column, the servo circuit to the reel motor is interrupted, and a brake is applied to maintain the loop in the central portion. Thus the reel motor is operated at times with torque in one direction, and at other times with torque in the opposite direction, and at still other times with a brake being set when the loop is in a central part of the vacuum column. In such case, a reel motor providing only unidirectional torque during bidirectional tape motion, as found in the subject invention, is not feasible.

The prior art, such as U.S. Patent No. 3,104,071 to Newberg, shows the use of constant torque reel drive motors without the buffering intervention of vacuum columns. This patent does not permit reel motion independent of capstant motion, which is required for fast start/stop operation.

U.S. Patent No. 2,071,192 to Younts describes a tape drive with independent reel motors which are not of the constant torque type, but have their torque versus speed characteristics intentionally varied by a resonant circuit which limits the stall torque. U.S. Patent No. 3,045,937 to Johnson varies the reel motor torque as a function of the reel radius in order to maintain a constant force on the tape independent of reel radius. U.S. Patent No. 3,104,071 to Newberg modifies the torque of its reel motor as a function of the direction of tape motion so that the pulling reel always supplies more tape force than the supplying reel.

It is therefore the object of this invention to provide a tape drive capable of fast start/stop operation while maintaining construction simplicity.

It is another object of this invention to provide a tape drive which obtains independent reel or capstan operation utilizing vacuum columns without requiring tape loop position sensors or tape reel servo circuits or devices.

It is a further object of this invention to provide independent tape reel or capstan operation without any independent servo control of the reel motors.

It is a still further object of this invention to provide independent unidirectional torque reel motor operation without any servo control.

It is still another object of this invention to provide a combination of a variable-force vacuum column with a unidirectional torque reel motor to avoid the necessity for any servo interdependency between the vacuum column operation and the reel motor operation.

This invention uses a pair of unidirectional torque motors connected to tape reels respectively supplying tape to adjacent variable-force vacuum columns. An independently operated capstan is located between the two vacuum columns, i.e., the capstan drive is not connected to any reel drive. If the capstan can not hold the tape in a stopped position at a read/write head, a tape brake may also be provided. The unidirectional torque direction for each reel motor attempts to remove tape from its respective variable-force vacuum column. Simultaneously a counter balancing vacuum force on the loop is attempting to pull tape into the column. The loop position in each vacuum column stabilizes at a position where the loop receives a vacuum force equal to the opposing motor torque force. If the capstan dynamically pulls tape from either column, the loop rises in that column. This increases the vacuum force on the loop, which then overcomes the reel torque to pull tape from the reel into the column to lower the loop position until the forces eventually balance again with the loop at its static position. If the tape is moved into the column by the capstan, the loop position dynamically drops which lowers the vacuum force on the loop; then an opposite dynamic action takes place, in which the unidirectional reel torque moves tape from the column to lift the loop position, until it again stabilizes at its static position. The static equilibrium position for the loop varies with the reel radius when the reel motor torque is substantially constant. In this manner, the system provides independent operation among the two reel motors and the capstan.

The foregoing and other objects, features and advantages of the invention will be apparent from the following more particular description of the preferred embodiment of the invention illustrated in the accompanying drawings of which:

Figure 1:
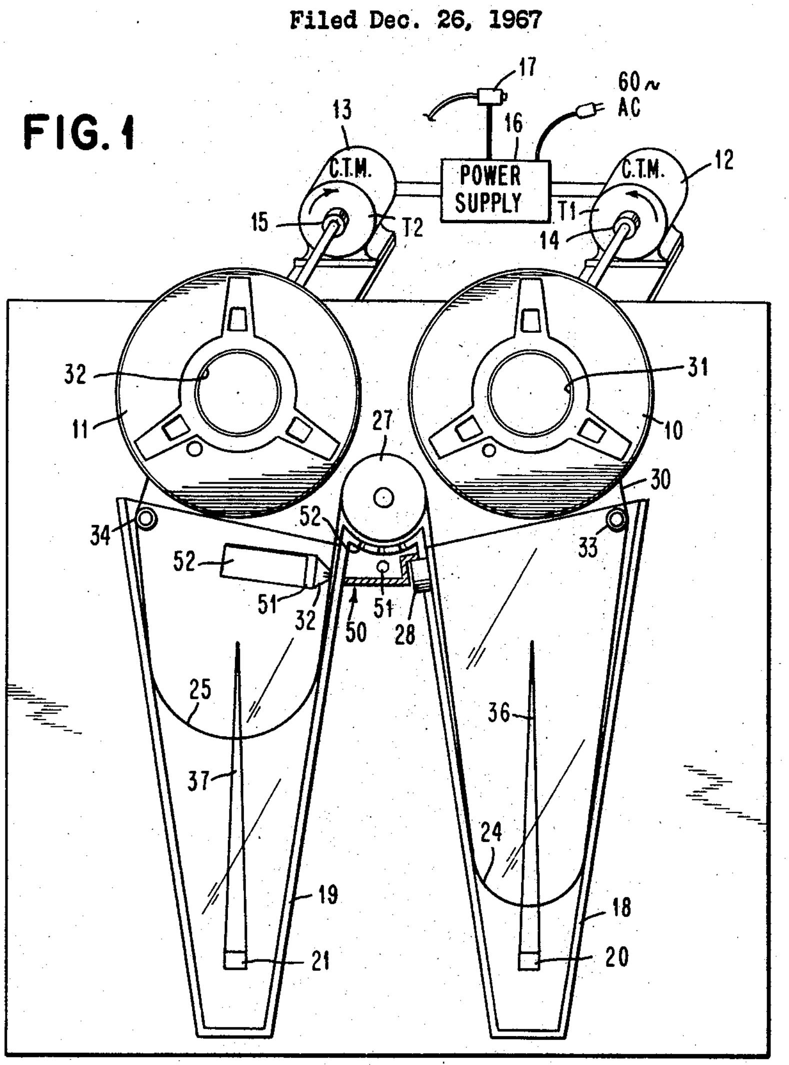
FIGURE 1 is a schematic representation of an embodiment of this invention.

Reference is now made to the detailed embodiment shown in the drawings. In FIGURE 1 a supply reel 10 is fastened to a hub 31 and a take-up reel 11 is fastened to a corresponding hub 32. Constant torque motors (C.T.M.) 12 and 13 have shafts 14 and 15 coupled respectively to hubs 31 and 32. Motors 12 and 13 are fastened to the frame of the tape drive and are powered from the output of a power supply 16 which may receive input power from a 60-cycle-per-second alternating current source. The output power from supply 16 to motors 12 and 13 may be A.C. or D.C. and is controlled by a push button switch 17, which might be located on the front panel of the tape drive.

Constant torque motors are presently commercially available. Most D.C. motors may be operated as constant torque motors by connecting a current limiting circuit between the motor and its D.C. power source. Also constant torque reel operation may be obtained by coupling each reel to any motor through a respective slip-clutch, which may be conventional.

The tape 30 from supply reel 10 is provided over an idler 33 to a variable-force vacuum column 18, from which it passes a vacuum brake 28 and a capstan 27. Then the tape enters the other vacuum column 19, where it is engaged by a read/write/erase head assembly. A take-up reel 11 receives the tape from column 19 after it passes over idler 34.

Each variable-force vacuum column 18 and 19 is represented by a tapered vacuum column in which a tape loop 24 or 25 narrows as it becomes longer within the column. A vacuum port 20 or 21, respectively, is found near the bottom of the column. Slots 36 and 37 are located centrally along the back walls of the respective columns. Each slot 36 and 37 is enclosed and is connected to its vacuum port 20 and 21, respectively. Each slot 36 or 37 has the effect of increasing the force variability on the tape as the loop position varies along the length of the column. As the loop 24 or 25, respectively, moves downwardly in a column, a greater proportion of the slot is uncovered to atmospheric pressure above the loop to bleed air around the loop into the vacuum column below the loop; this weakens the vacuum below the loop to further decrease the force on the loop as the loop moves downwardly in a column.

According the effect of slot 24 or 25, considered as an independent column component, causes a decrease in force on the tape as the loop moves downwardly independently of taper of the vacuum column, which also cause a decrease in force on the tape as the tape moves downwardly in the column. These two force-variability components are combined on the tape loop to obtain a resultant force-variability dependent on both. The overall force-variability may be described as a ratio of forces on the loop at positions above the top and near the bottom of either slot 36 or 37.

There are several varieties of this known in the art for varying loop force with loop position in a vacuum column. For example, a slot such as 35 or 36 may be used in a parallel wall vacuum column to make it force-variable with respect to the loop length in the column.

Head 32 is supported on a bracket 51 pivotable at or behind the back wall of vacuum column 19. When pivoted backwardly, the head and bracket move through an opening 52 in the back wall to avoid interference with the loading of the tape into the vacuum column. After tape loading into the vacuum column, head 32 may be swung outwardly to engage the magnetic surface of the tape. Opening 52 is enclosed behind column 19 so that air can not pass through it into column 19.

Capstan 27 may be of the vacuum type, wherein it is hollow and has a plurality of ports located about its outer surface through which vacuum may communicate to the back side of the tape as it engages capstan 27. A vacuum brake 28 is positioned adjacent to the capstan and is an optional feature used for holding the tape in a fixed position when the capstan is stopped. Brake 28 applies vacuum to the tape only when tape is stopped, while capstan 27 continuously applies vacuum to the tape.

A stationary vacuum chamber 50 (shown partially sectioned in FIGURE 1) is positioned adjacent to capstan 27 and wraps partly around its bottom side. Chamber 50 has a plurality of holes 52 on its wrap-around surface for communicating vacuum to the underside of the capstan, which then transmits the vacuum to the tape to increase the friction between the tape and capstan for preventing slippage during fast start/stops. Also the capstan may be used in lieu of brake 28 if the capstan shaft can remain stationary during required stopped tape operation, against unbalanced forces pulling from the opposite vacuum columns 18 and 19. Thus brake 28 is optional, and any means may be used that is capable of holding the tape, when stopped, against unbalanced pulling forces from the two vacuum columns when the tape loops have different lengths.

Figure 2:
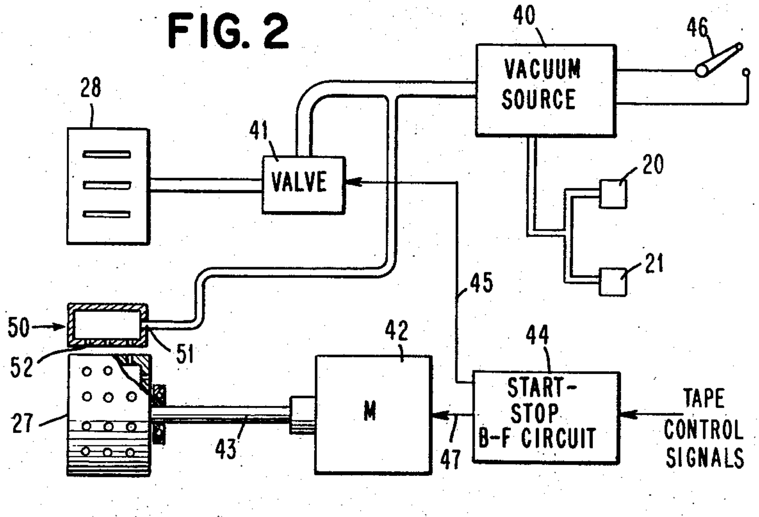
FIGURE 2 illustrates vacuum brake and vacuum capstan control means.

FIGURE 2 represents a schematic of the vacuum system. A valve 41 is located between a vacuum source 40 and brake 28 to quickly start or stop vacuum to the surface of brake 28. Valve 41 may be constructed in the manner described in an article titled "High Speed Valve" by Anthony Orlando published in the October 1963 issue of the IBM Technical Disclosure Bulletin on page 40.

A switch 46 controls the power to operate vacuum source 40, which also connects to vacuum column ports 20 and 21.

A capstan control circuit 44 controls the start/stop and backward/forward motion of a capstan motor 42. This start/stop circuit may be the type commercially found in digital computer tape drives. The start/stop signal output on lead 45 from circuit 44 is provided to valve 41 to open it to pass vacuum from source 40 to brake 28 when circuit 44 is providing a stop signal output.

A bus 47 provides opposite direction currents to a capstan drive motor 42 to drive it forward/backward under the control of circuit 44. Motor 42 stops when current on bus 47 is stopped, or when dynamic braking and/or a counteracting reversing current is applied on bus 47 to motor 42 by circuit 44.

Motor 42 is directly coupled by a shaft 43 to capstan 27. Motor 42 may be a printed circuit type as described in U.S. Patent No. 3,154,740 to R. Houldin, which enhances fast start/stop operation.

In operation, switch 17 is off when a supply reel 10 is placed upon hub 31. The tape is threaded to take-up reel 11 either manually or automatically. Then switch 46 is closed to actuate vacuum source 40. The threaded tape is loaded into column 18 first, because the larger diameter tape coils on supply reel 10 causes the tape to be closer to column 18 than to column 19. As soon as the tape begins loading into column 18, vacuum brake 28 grabs the tape and holds it at one side of both columns. Each reel 31 and 32 is oppositely rotated against its unidirectional motor torque under the force of its tape loop, which force is greater than the motor torque force when each loop first enters its vacuum column. As each loop moves further into its column it continues to pull tape from its reel against the motor torque. The vacuum pulling force decreases as the tape loop moves lower until the loop reaches a stabilized position where the vacuum pulling force becomes equal to the opposing torque force from its reel. A high initial stabilized loop position reached in vacuum column 19, because the small initial tape-coil radius on the take-up reel causes a large force to be transmitted from its constant torque motor 13 due to short leverage. On the other hand, the initial position of the supply reel loop is much lower due to the large initial coil diameter on the supply reel causing longer leverage to tape 30 from its constant torque motor 12. Hence the initial static positions of the tape loops are represented by the relative positions of loops 24 and 25 in FIGURE 1. The static loop position in either column will therefore change as the tape radius changes on each respective reel during tape operation.

Whenever a start signal is provided on bus 47 from circuit 44 in either direction, the signal on lead 45 actuates valve 41 to block vacuum to brake 28, which releases tape 30. Simultaneously bus 47 provides current to motor 42 to start acceleration of capstan 27. Accordingly as brake 28 releases the tape and capstan 27 begins moving the tape, a transient effect occurs in which the tape is moving at the capstan but neither reel 10 or 11 is moving. This is permitted because of the independent drives among the reels and capstan with the intervention of the vacuum columns between them to buffer their independent actions. During this transient time, these differences in movement of the tape at the capstan and the reels are compensated by opposing dynamic changes in positions of the loops 24 and 25, which largely depend upon the acceleration and direction of motion of capstan 27 during and shortly following the transient capstan response.

As the tape loops oppositely move in response to the transient velocity change of the tape at the capstan, a compensating follow-up motion automatically occurs for the reels in a direction which tends to restore the positions of the loops to their static positions dependent on their respective reel radii. As the tape continues to move, the reel diameters change and the static positions of the loops change correspondingly to obtain the equalized force situation previously described. When both reels of tape have equal radii, then the loops will be equally positioned in both columns. The head 32 may of course be reading or writing on the magnetic surface of the tape as it is moving, either continuously or incrementally.

The unidirectional torque applied to reels 10 and 11 by motors 12 and 13 may be unequal up to a tolerance that is permitted by a permissable extra length for the vacuum columns. Hence torque inequality may exist within the tolerance range, which range is controllable by any required amount. An adjustment for each motor may be provided as to initially adjust them for substantially equal torque. Torque variation during motor rotation is also permissable within a given tolerance.

By providing the vacuum ports 20 and 21 substantially above the bottom of the vacuum columns, there is a tendency to avoid the bottoming of the tape loops in the columns. That is, force on the loop is lost when it drops below port 20 or 21 and the opposing motor torque will quickly pull it upwardly. Bottoming is undesirable since the bottoms of tape columns tend to collect dust which might contaminate the tape surface.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a tape drive having at least one reel comprising,
- a variable-force vacuum column receiving tape from said reel along one side of said column, said tape connected in direct opposing force relationship between said reel and said vacuum column,
- a capstan driving means positioned on the opposite side of said column, and
- a unidirectional torque means connected to said reel with a torque direction independent of tape-movement direction for withdrawing tape from said column, said torque means opposing the force from said variable force vacuum column.

2. In a tape drive receiving a pair or reels on which tape is wound, comprising:
- a pair of variable-force vacuum columns respectively positioned to receive tape from said reels, said tape connected in direct opposing force relationship between each reel and the adjacent vacuum column,
- an intermediate capstan driving means positioned along a tape path between said vacuum columns, and
- a pair of unidirectional torgue means being respectively connected to said reels to drive each in a direction for withdrawing tape from its respective vacuum column independent of tape-movement direction, each of said torque means opposing the force from said variable force vacuum columns to obtain a stable static position of said tape in each vacuum column.

3. A tape drive as defined in claim 2 in which said variable-force vacuum columns are tapered.

4. A tape drive as defined in claim 2 in which each of said variable-force vacuum columns has at least one slot in a wall connected to a vacuum source.

5. A tape drive as defined in claim 2 in which said capstan means is a single capstan continuously engaging tape between said vacuum columns.

6. A tape drive as defined in claim 2 in which braking means is provided adjacent to said capstan to hold said tape in a stopped position.

References Cited

UNITED STATES PATENTS

| | | |
|---|---|---|
| 2,831,678 | 4/1958 | Mac Neill. |
| 3,112,473 | 11/1963 | Wicklund et al. |

GEORGE F. MAUTZ, Primary Examiner

U.S. Cl. X.R.

226—95, 118